W. G. Kenyon,
Tedder.
No. 93,313.        Patented Aug. 3, 1869.
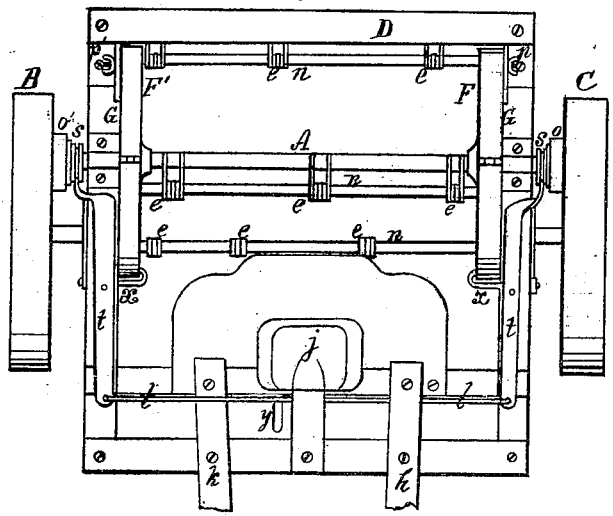
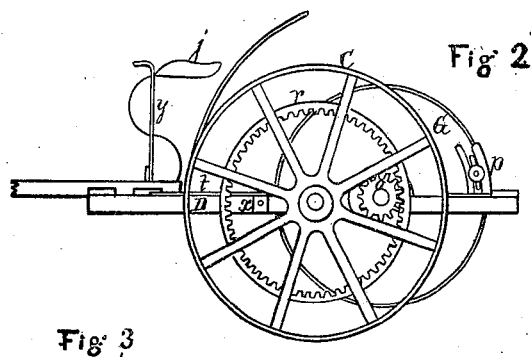
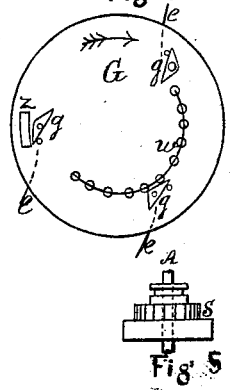
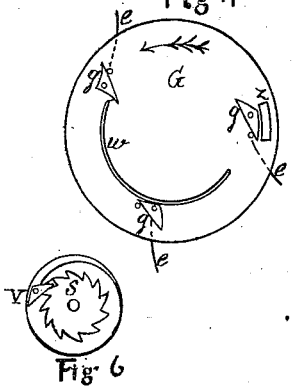
Witnesses
Benjamin Avery
James E. Arnold
Wm. G. Kenyon

United States Patent Office.

WILLIAM G. KENYON, OF WAKEFIELD, RHODE ISLAND.

Letters Patent No. 93,313, dated August 3, 1869.

IMPROVEMENT IN HAY-SPREADERS.

The Schedule referred to in these Letters Patent and making part of the same.

To all whom it may concern:

Be it known that I, WILLIAM G. KENYON, of Wakefield, in the county of Washington, in the State of Rhode Island, have invented certain new and useful Improvements in Hay-Tedders; and do hereby declare the following to be a full and correct description thereof, reference being had to the accompanying drawings, making part of this specification, and to the letters and numbers of reference marked thereon, similar letters and numbers being used in all the figures to denote the same part.

In these drawings—

Figure 1 is a top view of the tedder.

Figure 2 shows a side elevation.

Figures 3 and 4 show the devices that govern the motions of the teeth.

Figures 5 and 6 show the internal arrangement of the ratchet-wheels.

Figure 7 represents one of the cross-pieces with friction-roll.

The improvements in hay-tedders that are herein described relate more particularly to the manner of operating the teeth, so as to cause them to enter and leave the hay or grass properly, and to the construction of the ratchet-wheels and parts whereby the machine is thrown in and out of gear.

The construction is as follows:

The driving-wheels B and C are placed on short axles or studs, secured to the sides of the frame D.

A shaft, A, is placed across the frame, and turns in boxes on each side-piece of the same.

On each end of this shaft are small pinions $o\ o'$, which mesh into the teeth of the large rims $r\ r$, one of which is fastened to the spokes of each driving-wheel.

These pinions are not fast on the shaft A, but have pawls $v\ v$ pivoted to their sides, which pawls catch into the ratchet-wheels S S, which are secured to the shaft so as to turn with it, but so that they may be slid endways out of gear.

On the shaft A, just inside of the frame D, are two head-plates, F F', one on each end, in which the ends of the teeth-bars $n\ n\ n$ are held, the ends of the bars passing through the plates, and having fastened to them the cross-pieces $g\ g\ g$.

G G are two circular plates, placed just outside of the head-plates, and which are fastened to the sides of the frame D by the standards $p\ p'$, which have curved slots and bolts working in them, to hold the plates, wherever they may be set, another bolt, $x$, being placed on the opposite side, to help hold the plates.

On the inner sides of these plates G are fastened circular projecting flanges $w\ w$, against which the cross-pieces $g\ g\ g$ press, to give them the proper position when the teeth $e\ e$ are entering the hay; and $z\ z$ are projections, also fast to the inside of the plate G, against which the ends of the cross-pieces strike to turn the teeth back, so as to drop the hay at the proper time.

The teeth $e\ e\ e$ are secured to the bars $n\ n\ n$, so as to turn with them.

$y$ is a hand-lever, pivoted to the front cross-bar of the frame, and extending up by the side of the seat $j$.

This lever is connected by the bars $l\ l$ to the levers $t\ t$, which are pivoted to the side-bars of the frame, and which have their back ends fitted into circular recesses in the hubs of the ratchet-wheels S S.

Friction-rolls may be placed in the flanges $w\ w$, or in the ends of the cross-pieces $g\ g\ g$, to reduce the friction.

The plates G G have rims on their outsides, projecting over the head-plates, to keep the hay, &c., out of the space between them.

The operation is as follows:

The machine being drawn over the ground, the driver draws the lever $y$ toward him, and throws the ratchet-wheels into gear with the pawls on the pinions $o\ o'$. This causes the driving-wheels to turn the shaft A, with its head-plates, teeth-bars, &c.

The cross-bars $g\ g\ g$, as they move around down on the front side, catch one end against the flange $w$, which turns them so that the teeth on the bars stand nearly directly down, so as to enter the hay, and hold them in their places until they rise again, when the other end strikes against the projection $z$, which turns the bar again so that the teeth shall drop the hay and not carry it over the machine.

By means of the bolts in the standards $p\ p'$, the plates G may be set so as to alter the time at which the teeth enter and leave the hay or grass, according to whether it be light or heavy.

$j$ is a seat for the driver, and $k\ k$ indicate the position of the thills.

Having thus described my improvements,

What I claim as my invention, and desire to secure by Letters Patent, is—

The combination of the circular plates G G, having the flanges $w\ w\ q$, projections $z\ z$ on them, with the cross-pieces $g\ g\ g$, and teeth-bars $n\ n\ n$, substantially as herein described and for the purpose set forth.

WM. G. KENYON.

Witnesses:
BENJAMIN ARNOLD,
JAMES E. ARNOLD.